(12) United States Patent
Bailey

(10) Patent No.: US 6,793,160 B1
(45) Date of Patent: Sep. 21, 2004

(54) BURNER NOZZLE

(75) Inventor: Melburn D. Bailey, Coarse Gold, CA (US)

(73) Assignee: Certainteed Corporation, Valley Forge, PA (US)

( * ) Notice: Subject to any disclaimer, the term of this patent is extended or adjusted under 35 U.S.C. 154(b) by 263 days.

(21) Appl. No.: 09/618,030

(22) Filed: Jul. 17, 2000

(51) Int. Cl.[7] .............................. A62C 2/08; B05B 7/08
(52) U.S. Cl. ..................... 239/548; 239/544; 239/549; 239/553.5; 239/554
(58) Field of Search .................. 239/548, 544, 239/549, 553.5, 552, 554, 556, 561, 533.2; 431/347, 326, 327, 328, 329; 432/180–182

(56) References Cited

U.S. PATENT DOCUMENTS

| | | | | |
|---|---|---|---|---|
| 1,874,283 A | * | 8/1932 | Goldberg | 239/548 |
| 2,008,932 A | * | 7/1935 | Siegmund | 239/548 |
| 2,398,884 A | * | 4/1946 | Crowe | 239/544 |
| 2,511,380 A | * | 6/1950 | Stadler | 239/544 |
| 4,664,619 A | * | 5/1987 | Johnson et al. | 431/154 |
| 5,019,686 A | * | 5/1991 | Marantz | 219/76.14 |
| 5,174,744 A | * | 12/1992 | Singh | 431/347 |
| 5,288,026 A | * | 2/1994 | Wilton | 239/548 |
| 5,401,167 A | * | 3/1995 | Martin | 432/181 |

* cited by examiner

Primary Examiner—Davis Hwu
(74) Attorney, Agent, or Firm—Oblon, Spivak, McClelland, Maier & Neustadt, P.C.

(57) ABSTRACT

A nozzle for a burner including a body having a first end adapted to attach to the burner and a second end configured to discharge gas and oxygen for combustion within an industrial furnace. The body has a plurality of tubes extending therethrough. Each tube has an inlet on the first end of the body, and an outlet on the second end of the body. The tubes are configured to be separate along a substantial length of the body, thereby ensuring that the tubes are not joined together to form a large cavity within the body. Preferably, any overlap between the tubes does not extend beyond ten percent of the overall length of the body. The structure of the nozzle provides thick, strong exterior walls of the body that resist failure.

18 Claims, 2 Drawing Sheets

BURNER NOZZLE

BACKGROUND OF THE INVENTION

1. Field of the Invention

The present invention relates generally to a burner nozzle configured to resist failure and extend the useful lifetime of the nozzle.

2. Discussion of the Background

High temperature combustion is often employed in many industrial processes such as in fiberglass manufacturing. Burner nozzles suffer from common problems of corrosion and fouling in high temperature industrial processes. Water cooling of metallic nozzles is often used to prevent high temperature corrosion or melting. Although water cooling is effective in a relatively clean furnace atmosphere, it adds to the complexity of the combustion system and also could escalate the corrosion and fouling problem when the furnace atmosphere contains condensible vapors. Therefore, ceramic nozzles have been proposed for use with high temperature combustion as a way to avoid the need for water cooling. However, presently available ceramic nozzles tend to develop cracks due to thermal and other stresses, and are not considered dependable for many industrial applications.

FIG. 4 depicts a ceramic nozzle 100 manufactured by PRAXAIR for use with PRAXAIR industrial burners. The nozzle 100 includes a body 110 having a large cavity 112 that extends along a substantial portion thereof, and three outlet tubes 114, 116, and 118 extending off the cavity 112. The cavity 112 has an inlet 120 and the outlet tubes 114, 116, and 118, each have an outlet 122, 124, and 126, respectively. The cavity 112 creates a large void within the body 110. The body 110 includes an upper wall 128 with an indented portion 129 and a lower wall 130 with an indented portion 131. The inventors have observed that the nozzle 100 has a tendency to fail or crack at an end region of the cavity 112 where the cavity 112 joins with the tubes 114, 116, and 118, as indicated in FIG. 4 by crack 102. The relatively thin section of the walls 128 and 130 at the end region of the cavity 112 frequently prematurely fail, causing failure of the nozzle 100. The inventors of the present invention have observed that the burner nozzles depicted in FIG. 4 typically have a lifetime of three to five weeks of industrial use. As these burner nozzles are relatively expensive to replace, such premature failure of the burner nozzles can unnecessarily increase the operating costs of the burner.

Based upon the above observations by the inventors of the present invention, the inventors have determined that a burner nozzle is needed that will overcome the disadvantages discussed above.

SUMMARY OF THE INVENTION

An object of the present invention is to provide a burner nozzle with thick, strong exterior body walls that resist failure. The present invention advantageously provides a nozzle body having separate tubes extending therethrough. Since the tubes are generally separated in the present invention, the body does not have any significant cavities therein and the exterior walls of the body remain thick and strong, thereby resisting failure of the exterior walls.

The present invention advantageously provides a nozzle for a burner including a body having a first end adapted to attach to the burner and a second end configured to discharge gas and oxygen for combustion within an industrial furnace. The body is preferably configured as a flat flame burner nozzle such that it has a generally rectangular cross-sectional shape. The body preferably has a first tube, a second tube, and a third tube extending therethrough. Alternative embodiments can include two tubes, or four or more tubes, depending upon the desired output of the burner nozzle. The number and size of the tubes used are dependant upon the desired length and shape of the flame, and the volume of gas and oxygen flow through the nozzle. Each tube has an inlet on the first end of the body, and an outlet on the second end of the body. The tubes are configured to be separate along a substantial length of the body, thereby ensuring that the tubes are not joined together to form a large cavity within the body. Preferably, any overlap between the tubes does not extend beyond ten percent of the overall length of the body. The structure of the present invention provides thick, strong exterior walls of the body that resist failure.

In the first embodiment, the first tube, the second tube, and the third tube are all linear in order to simplify the manufacturing of the nozzle and provide a simplified flow of oxygen and gas through the body. Alternatively, the tubes can be configured to be non-linear, or can be configured to include several different section, such as a non-linear section and a linear section, plural linear sections in series, or plural non-linear sections in series. In the first embodiment the second tube is oriented to extend along a horizontal plane, while the first tube is angled upwards from the horizontal plane by an angle $\theta_1$ and the linear third tube is angled downwards from the horizontal plane by an angle $\alpha_1$. Preferably, the angle $\theta_1$ and the angle $\alpha_1$ are equivalent, although these angles can be configured to be different depending upon the shape and size of the flame desired. In the first embodiment, due to the linear configuration of the tubes, the angles of the tubes coincide with the angles of dispersion of the gas and oxygen from the nozzle. The angle of dispersion as used herein is defined as the angle of the discharge from each outlet in relation to the horizontal plane. Note that, an outlet will generally disperse fluid therefrom in a conical manner, rather than simply along the angle of dispersion.

The present invention further provides a second embodiment that includes a body having a first tube, a second tube, and a third tube. In the second embodiment, the tubes are configured to be separate along an entire length of the body, without any joining of the inlets or outlets. The first and third tubes each include a first linear section and a second linear section, while the second tube only include one linear section extending along the horizontal plane. The first linear sections extend parallel to the horizontal plane, while the second linear sections define the angles of dispersion for the first tube and the third tube. The use of first and second linear sections in the first and third tubes of the second embodiment provides for an increase in the dispersion angles for the first and third tubes in the second embodiment as compared to the dispersion angles for the first and third tubes in the first embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
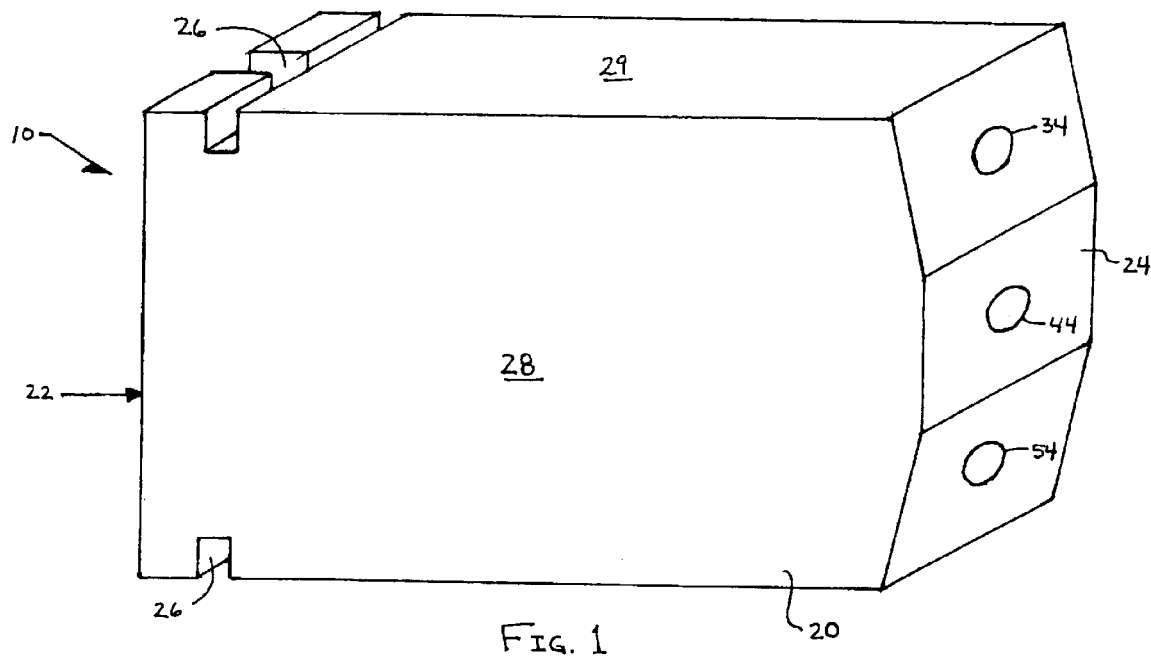
FIG. 1 is a perspective view of a first embodiment of a burner nozzle according to the present invention.
Figure 2:
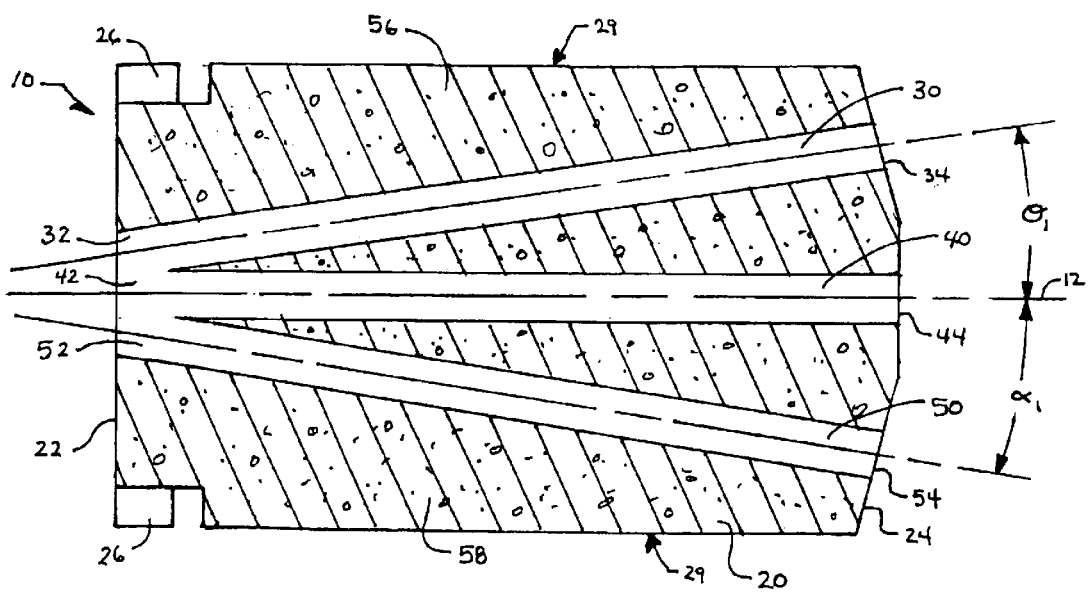
FIG. 2 is a cross-sectional view of the first embodiment of a burner nozzle according to the present invention depicted in FIG. 1.
Figure 3:
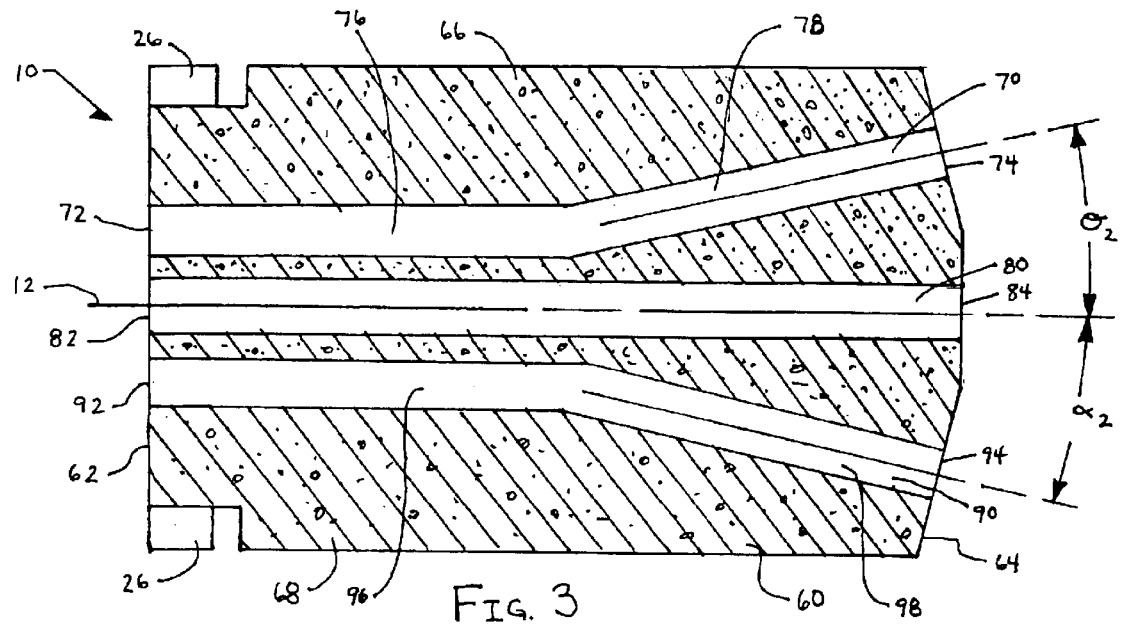
FIG. 3 is a cross-sectional view of a second embodiment of a burner nozzle according to the present invention.

Referring now to the drawings, where like reference numerals identify the same or corresponding parts throughout the several views, FIGS. 1 through 3 depict various embodiments of a burner nozzle according to the present invention.

FIGS. 1 and 2 depict a first embodiment of the present invention. The present invention includes a nozzle 10 for a burner (not depicted) including a body 20 having a first end 22 adapted to attach to the burner and a second end 24. The second end 24 of the body 20 is configured to discharge gas and oxygen for combustion within the industrial furnace. The body 20 depicted in FIGS. 1 and 2 include mounting channels 26 that allow the nozzle 10 to be mounted to the burner in a conventional manner, such that the first side 22 is positioned adjacent a gas and oxygen supply conduit (not depicted). The body 20 is configured as a flat flame burner nozzle such that it has a generally rectangular cross-sectional shape defined by top and bottom surfaces 28 and side surfaces 29. The nozzle 10 is preferably made of a conventional material, such as ceramic or brick, although other suitable materials such as metallic or other materials can alternatively be utilized if so desired.

In the first embodiment, the body 20 preferably has a first tube 30, a second tube 40, and a third tube 50 extending therethrough. Alternative embodiments can include two tubes, or four or more tubes, depending upon the desired output of the burner nozzle. The number and size of the tubes used are dependant upon the desired length and shape of the flame, and the volume of gas and oxygen flow through the nozzle. The shape and orientation of the tubes will effect the length and shape of the flame exiting the nozzle, as will be discussed in more detail below.

The first end 22 of the body 20 has a first inlet 32, a second inlet 42, and a third inlet 52, corresponding to the first tube 30, the second tube 40, and the third tube 50, respectively. The body 20 is mounted to the burner such that the first side 22 and the first inlet 32, the second inlet 42, and the third inlet 52 are positioned adjacent and in communication with the gas and oxygen supply conduit. The second end 24 of the body 20 has a first outlet 34, a second outlet 44, and a third outlet 54, corresponding to the first tube 30, the second tube 40, and the third tube 50, respectively. The first outlet 34, the second outlet 44, and the third outlet 54 provide a passage for the discharge of the oxygen and gas flowing through the tubes prior to combustion of the gas within the furnace.

The first tube 30, the second tube 40, and the third tube 50 are configured to be separate along a substantial length of the body 20. By defining that the tubes 30, 40, and 50 are separate along a substantial length of the body, it is ensured that the tubes are not joined together to form a large cavity within the body 20. The first tube 30, the second tube 40, and the third tube 50 are preferably formed separate along an entire length of the body 20 (see FIG. 3, for example). However, the joining together of the inlets, 32, 42, and 52, of the tubes, 30, 40, and 50, can be provided, as long as the open area formed at the joint does not define a significantly large open area within the body 20. Preferably, the overlap between the tubes 30, 40, and 50, does not extend beyond ten percent of the overall length of the body 20. The structure of the present invention provides thick, strong exterior walls 56 and 58 that resist failure.

In the first embodiment depicted in FIGS. 1 and 2, the first tube 30, the second tube 40, and the third tube 50 are all linear in order to simplify the manufacturing of the nozzle 10 and provide a simplified flow of oxygen and gas through the body 20. Alternatively, the tubes can be configured to be non-linear, or can be configured to include several different section, such as a non-linear section and a linear section, plural linear sections in series, or plural non-linear sections in series. The tubes 30, 40, and 50 of the first embodiment are configured to have a circular cross-section, and are configured to maintain a constant cross-sectional area over a substantial or entire length thereof. Alternatively, the tubes 30, 40, and 50 can be configured to have a cross-sectional shape different than circular, and/or can be configured to vary in cross-sectional area (by varying the cross-sectional shape, varying cross-sectional size, or by varying both the cross-sectional shape and the cross-sectional size) over a substantial or entire length thereof.

The first embodiment of the present invention includes a linear second tube 40 that is oriented to extend along a horizontal plane 12 as view in FIG. 2. The linear first tube 30 is angled upwards from the horizontal plane 12 by an angle $\theta_1$ and the linear third tube 50 is angled downwards from the horizontal plane 12 by an angle $\alpha_1$. Preferably, the angle $\theta_1$ and the angle $\alpha_1$ are equivalent, although these angles can be configured to be different depending upon the shape and size of the flame desired. In the first embodiment, due to the linear configuration of the tubes, the angles of the linear tubes 30, 40, and 50 coincide with the angles of dispersion of the gas and oxygen from the nozzle. The angle of dispersion as used herein is defined as the angle of the discharge from each outlet in relation to the horizontal plane 12. Note that, an outlet will generally disperse fluid therefrom in a conical manner, rather than simply along the angle of dispersion. The angles of dispersion of the tubes of the present invention can be set at substantially any desired predetermined angle, however, preferably the angles of dispersion are in a range from about 7 degrees to about 15 degrees from the horizontal plane 12. For example, in the preferred embodiment of the first embodiment the second tube 40 has an angle of dispersion of zero degrees, and the first tube 30 and the third tube 50 both have an angle of dispersion of about 7.5 degrees.

FIG. 3 depicts a cross-sectional view of a second embodiment of the present invention. In the second embodiment, the body 60 preferably has a first tube 70, a second tube 80, and a third tube 90 extending therethrough. The first end 62 of the body 60 has a first inlet 72, a second inlet 82, and a third inlet 92, corresponding to the first tube 70, the second tube 80, and the third tube 90, respectively. The body 60 is mounted to the burner such that the first side 62 and the first inlet 72, the second inlet 82, and the third inlet 92 are positioned adjacent and in communication with the gas and oxygen supply conduit. The second end 64 of the body 60 has a first outlet 74, a second outlet 84, and a third outlet 94, corresponding to the first tube 70, the second tube 80, and the third tube 90, respectively. The first tube 30, the second tube 40, and the third tube 50 are configured to be separate along an entire length of the body 20, without any joining of the inlets, 72, 82, and 92. The structure of the present invention provides thick, strong exterior walls 66 and 68 that resist failure.

In the second embodiment, the first tube 70 includes a first section or portion 76 and a second section or portion 78, and the third tube 90 includes a first section or portion 96 and a second section or portion 98. The sections 76, 78, 96, and 98 are all linear in the second embodiment, with the first sections 76 and 96 extending parallel to the horizontal plane 12. The second sections 78 and 98 define the angle of dispersion for the first tube 70 and the third tube 90, respectively. The linear second tube 80 is oriented to extend along the horizontal plane 12 as viewed in FIG. 3. The second section 78 of the first tube 70 is angled upwards from the horizontal plane 12 by an angle $\theta_2$ and the second section 98 of the third tube 90 is angled downwards from the horizontal plane 12 by an angle $\alpha_2$. Preferably, the angle $\theta_2$ and the angle $\alpha_2$ are equivalent, although these angles can be configured to be different depending upon the shape and size of the flame desired. The angle $\theta_2$ defines a dispersion angle for the first tube 70 and the angle $\alpha_2$ defines a dispersion angle for the third tube 90. In the preferred embodiment of the second embodiment the second tube 80 has an angle of dispersion of zero degrees, and the first tube 70 and the third tube 90 both have an angle of dispersion of about 15 degrees. The increase in the dispersion angles for the first and third tubes 70 and 90 in the second embodiment as compared to the dispersion angles for the first and third tubes 30 and 50 in the first embodiment is due to the use of first and second linear sections in the first and third tubes 70 and 90 of the second embodiment.

The nozzle of the present invention can be manufactured using several different methods. Generally speaking one method for making the nozzle for a burner includes forming a nozzle body of a generally rectangular, brick-like shape. The body can be made of a conventional material, such as ceramic or brick, although other suitable materials can alternatively be utilized if so desired. With reference to the first embodiment depicted in FIGS. 1 and 2, then the mounting channels 26 and facets on the second end 24 of the body 20 can be cut using a conventional cutting tool. Alternatively, the second end 24 of the body can be formed with a smooth curved shape, however such a shape is more expensive to manufacture, and is therefore not preferable. The nozzle body can alternatively be formed by molding the body to have the desired shape, rather than beginning with a rectangular, brick-like shape. Then the tubes 30, 40, and 50 can be drilled through the body 20 at the appropriate angles using a conventional drilling machine. With reference to the second embodiment depicted in FIG. 3, the first tube 70 and the third tube 90 are formed using a two-step drilling process, while the second tube 80 can be formed using a one-step drilling process. With the first tube 70 and the third tube 90, the first sections 76 and 96 can be formed using a drill entering from the first end 62, while the second sections 78 and 98 can be formed using a drill entering from the second end 64 and joining with the first sections 76 and 96.

The present invention advantageously provides a nozzle body having separate tubes extending therethrough. Since the tubes are generally separated in the present invention, the body does not have any significant cavities therein and the exterior walls of the body remain thick and strong, thereby resisting failure of the exterior walls.

The embodiments of the present invention discussed herein are particularly well suited for use with PRAXAIR industrial burners, although the embodiments can be modified in order to be utilized with other suitable types of industrial burners, as will be readily apparent to one of skill in the art.

Figure 4:
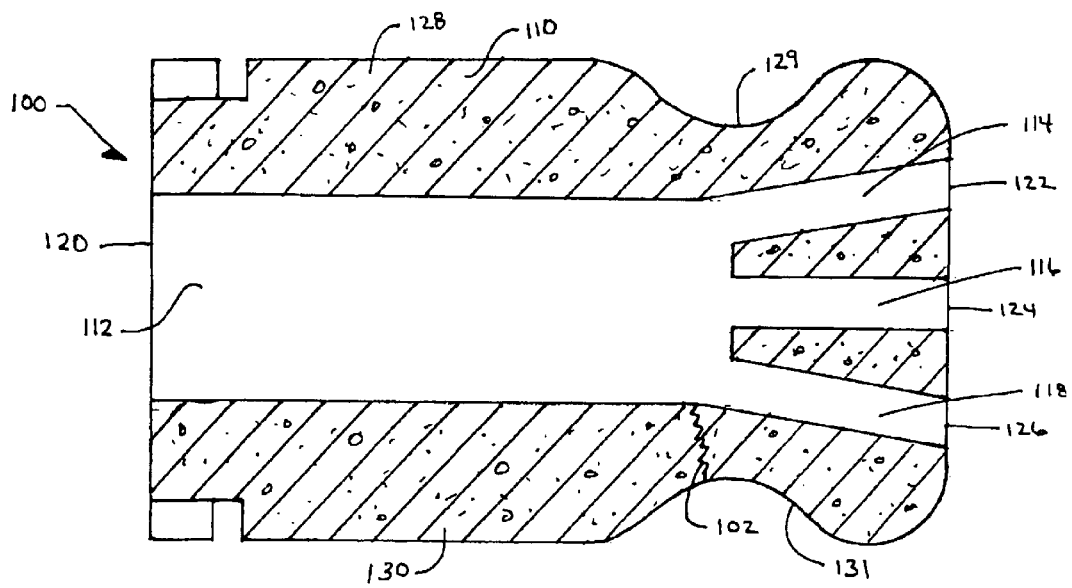
FIG. 4 is a cross-sectional view of a conventional burner nozzle.

The inventors have found that the burner nozzle depicted in FIG. 4 typically has a lifetime of three to five weeks of industrial use, while the first embodiment of the present invention has a lifetime of about five months of industrial use. As the cost of purchasing a replacement burner nozzle is relatively expensive, the increase in lifetime of the nozzle of the present invention provides a significant cost benefit.

Numerous variations of the present invention are possible in light of the above teachings. It is therefore to be understood that within the scope of the appended claims, the present invention can be practiced other than as specifically described herein.

What is new and desired to be secured by Letters Patent of the United States is:

1. A nozzle for a burner, said nozzle comprising:
   a body having a first end adapted to attach to the burner and a second end;
   a first tube extending through said body, said first tube having a first inlet on said first end of said body and a first outlet on said second end of said body; and
   a second tube extending through said body, said second tube having a second inlet on said first end of said body and a second outlet on said second end of said body,
   wherein said first tube and said second tube are separate along a substantial length of said body,
   wherein said first tube includes a first linear section connected to said first inlet and a second linear section connected to said first outlet, said second linear section being provided at a predetermined angle in relation to said first linear section, and
   wherein said first tube maintains a constant cross-sectional area over an entire length thereof, and wherein said second tube maintains a constant cross-sectional area over an entire length thereof.

2. The nozzle according to claim 1, wherein said first tube and said second tube are separate along an entire length of said body.

3. The nozzle according to claim 1, further comprising a third tube extending through said body, said third tube having a third inlet on said first end of said body and a third outlet on said second end of said body, wherein said third tube is separate from said first tube and said second tube along a substantial length of said body.

4. The nozzle according to claim 3, wherein said first tube, said second tube, and said third tube are separate along an entire length of said body.

5. The nozzle according to claim 3, wherein said first tube and said third tube each have an angle of dispersion in a range from about 7 degrees to about 15 degrees, and wherein said second tube has an angle of dispersion of about zero degrees.

6. The nozzle according to claim 1, wherein said second tube is linear along an entire length thereof.

7. The nozzle according to claim 1, wherein said first tube has an angle of dispersion in a range from about 7 degrees to about 15 degrees.

8. A nozzle for a burner, said nozzle comprising:
   a body having a first end adapted to attach to the burner and a second end;
   a first tube extending through said body, said first tube having a first inlet on said first end of said body and a first outlet on said second end of said body; and
   a second tube extending through said body, said second tube having a second inlet on said first end of said body and a second outlet on said second end of said body,
   wherein said first tube and said second tube are separate along a substantial length of said body,
   wherein said first tube includes a first linear section connected to said first inlet and a second linear section connected to said first outlet, said second linear section being provided at a predetermined angle in relation to said first linear section, wherein said first tube maintains a constant cross-sectional area over a substantial length thereof, and wherein said second tube maintains a constant cross-sectional area over a substantial length thereof, and wherein at least one of said first outlet and said second outlet has an angle of dispersion in a range from about 7 degrees to about 15 degrees.

9. The nozzle according to claim 8, wherein said first tube maintains a constant cross-sectional area over at least ninety percent of a length thereof, and wherein said second tube maintains a constant cross-sectional area over at least ninety percent of a length thereof.

10. A nozzle for a burner, said nozzle comprising:

a body having a first end adapted to attach to the burner and a second end, said first end having a plurality of inlet holes and said second end having a plurality of outlet holes, each inlet hole being connected to a single outlet hole by a separate tube, wherein all of said separate tubes in said body extend along a common plane in a non-coaxial orientation.

11. The nozzle according to claim 10, wherein said separate tubes are linear.

12. The nozzle according to claim 10, wherein at least one of said separate tubes includes a first linear section connected to one of said inlet holes and a second linear section connected to one of said outlet holes, said second linear section being provided at a predetermined angle in relation to said first linear section.

13. The nozzle according to claim 12, wherein another of said separate tubes is linear along an entire length thereof.

14. The nozzle according to claim 12, wherein another of said separate tubes is linear along an entire length thereof.

15. The nozzle according to claim 10, wherein said separate tubes maintain a constant cross-sectional area over a substantial length thereof.

16. A nozzle for a burner, said nozzle comprising:

a body having a first end adapted to attach to the burner and a second end, said first end having a plurality of inlet holes and said second end having a plurality of outlet holes, each inlet hole being connected to a single outlet hole by a separate tube, wherein all of said separate tubes in said body extend along a common plane, wherein at least one of said plurality of outlet holes has an angle of dispersion in a range from about 7 degrees to about 15 degrees.

17. A nozzle for a burner, said nozzle comprising:

a body having a first end adapted to attach to the burner and a second end, said body having a plurality of separate tubes extending therethrough, said plurality of separate tubes each having an inlet hole on said first end and an outlet hole on said second end, wherein all of said plurality of separate tubes in said body extend along a common plane in a non-coaxial orientation.

18. The nozzle according to claim 17, wherein at least one of said plurality of separate tubes includes a first linear section and a second linear section, said second linear section being provided at a predetermined angle in relation to said first linear section, and wherein another of said plurality of separate tubes is linear along an entire length thereof.

* * * * *